US012299715B1

(12) United States Patent
Brosnan et al.

(10) Patent No.: US 12,299,715 B1
(45) Date of Patent: May 13, 2025

(54) TRANSACTION MANAGEMENT SYSTEM

(71) Applicant: Toshiba Global Commerce Solutions, Inc., Durham, NC (US)

(72) Inventors: Susan W. Brosnan, Raleigh, NC (US); Jessica Snead, Cary, NC (US); Patricia Hogan, Raleigh, NC (US); Daniel Robert Goins, Wake Forest, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/494,256

(22) Filed: Oct. 25, 2023

(51) Int. Cl.
*G06Q 30/02* (2023.01)
*G06Q 20/20* (2012.01)
*G06Q 30/0251* (2023.01)

(52) U.S. Cl.
CPC ......... *G06Q 30/0268* (2013.01); *G06Q 20/20* (2013.01)

(58) Field of Classification Search
CPC ........ G06Q 30/0268; G06Q 30/0207–30/0277
See application file for complete search history.

(56) References Cited

U.S. PATENT DOCUMENTS

| | | | | | |
|---|---|---|---|---|---|
| 10,282,763 | B1* | 5/2019 | Sulejmani | ............. | H04W 4/026 |
| 10,402,870 | B2* | 9/2019 | Hogg | .................... | G06Q 20/202 |
| 10,616,415 | B1* | 4/2020 | Howard | ............. | H04M 3/5141 |
| 11,127,054 | B1* | 9/2021 | Sulejmani | ............. | H04W 4/029 |
| 11,151,492 | B2* | 10/2021 | Baughman | ........... | G06Q 20/202 |
| 2004/0117225 | A1* | 6/2004 | Fridman | ................. | H04L 67/04 705/1.1 |
| 2012/0116863 | A1* | 5/2012 | Boss | ................... | G06Q 30/0235 705/14.35 |
| 2013/0030875 | A1* | 1/2013 | Lee | ..................... | G06Q 30/0601 705/14.58 |
| 2013/0103486 | A1* | 4/2013 | Hess | ....................... | G06Q 30/02 705/14.38 |
| 2014/0180848 | A1* | 6/2014 | Argue | ..................... | G07G 1/01 705/16 |
| 2015/0088782 | A1* | 3/2015 | Zhang | ................ | G06Q 30/0281 705/346 |
| 2015/0127401 | A1* | 5/2015 | Hogg | ................. | G06Q 30/0281 705/7.15 |
| 2015/0206081 | A1* | 7/2015 | Lee | ........................ | G06Q 10/06 705/7.13 |
| 2015/0208043 | A1* | 7/2015 | Lee | ........................ | H04N 7/183 348/150 |

(Continued)

FOREIGN PATENT DOCUMENTS

CA 2928735 A1 * 11/2014

*Primary Examiner* — Thuy N Nguyen
(74) *Attorney, Agent, or Firm* — COATS & BENNETT, PLLC

(57) ABSTRACT

A method implemented by a Point of Sale (PoS) system. The method includes performing one or more PoS tasks in a retail environment. In addition, the method includes detecting that the transaction management system will be occupied with performing one or more PoS tasks for more than a threshold amount of time. The method further includes initiating an in-store event within the retail environment and generating a graphical notification interface and transmitting the graphical notification interface to at least one wireless device associated with a shopper in the retail environment. The graphical notification interface includes graphical elements depicting the in-store event.

14 Claims, 5 Drawing Sheets

(56) References Cited

U.S. PATENT DOCUMENTS

| | | | |
|---|---|---|---|
| 2015/0287108 A1* | 10/2015 | Monk | G07F 19/201 |
| | | | 705/5 |
| 2017/0228513 A1* | 8/2017 | Zhang | G06Q 10/06 |
| 2018/0033024 A1* | 2/2018 | Latapie | G06V 20/53 |
| 2018/0225615 A1* | 8/2018 | Thomas | G06Q 10/0633 |
| 2018/0244733 A1* | 8/2018 | Schaffer | C12N 15/8273 |
| 2019/0066087 A1* | 2/2019 | Shayovitz | G06Q 20/20 |
| 2020/0228747 A1* | 7/2020 | Ventura | H04N 21/4223 |
| 2020/0279310 A1* | 9/2020 | Kundu | G07G 1/0036 |
| 2021/0097461 A1* | 4/2021 | Baughman | G06V 20/52 |
| 2022/0051280 A1* | 2/2022 | Kwatra | G06Q 30/0224 |
| 2022/0078283 A1* | 3/2022 | Deole | H04M 3/5183 |
| 2022/0198886 A1* | 6/2022 | Subramanian | G08B 13/19613 |
| 2023/0154224 A1* | 5/2023 | Li | G06V 20/10 |
| | | | 382/103 |
| 2023/0419201 A1* | 12/2023 | Pachigar | H04W 64/003 |

\* cited by examiner

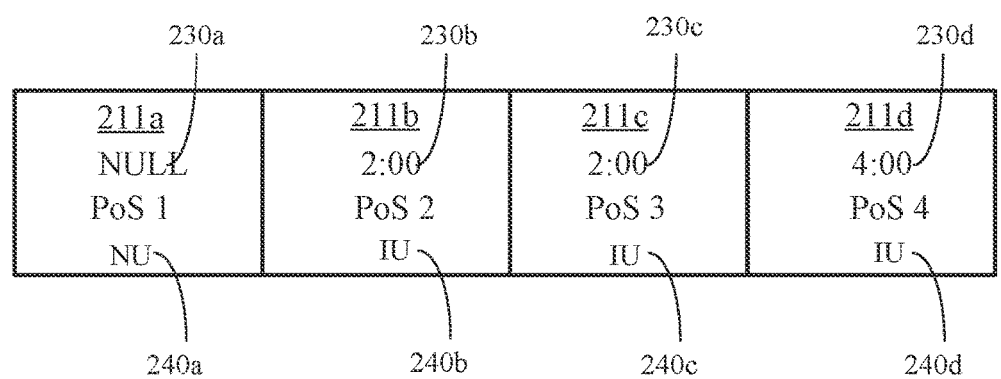
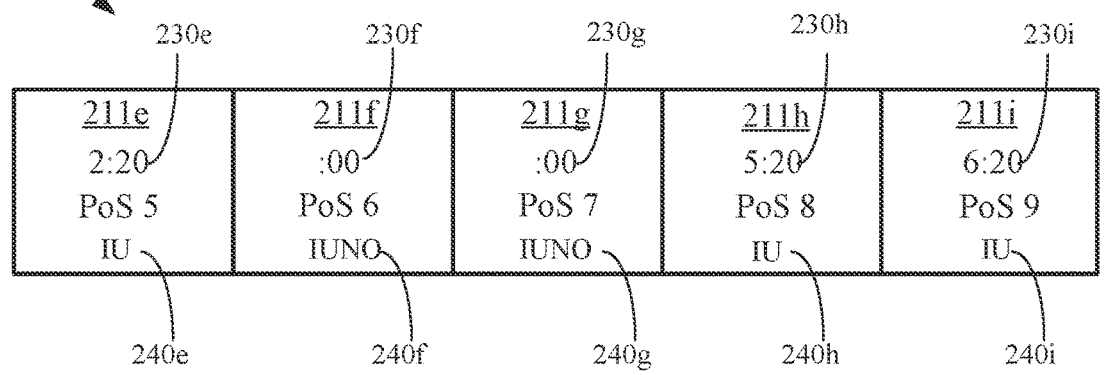
FIG. 2

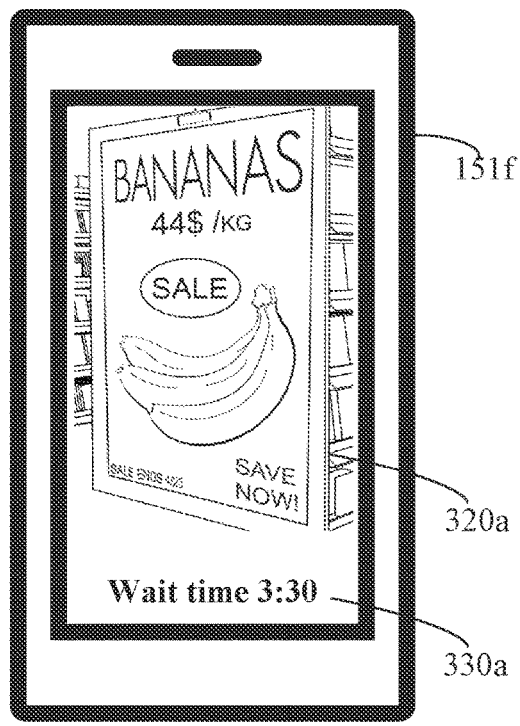 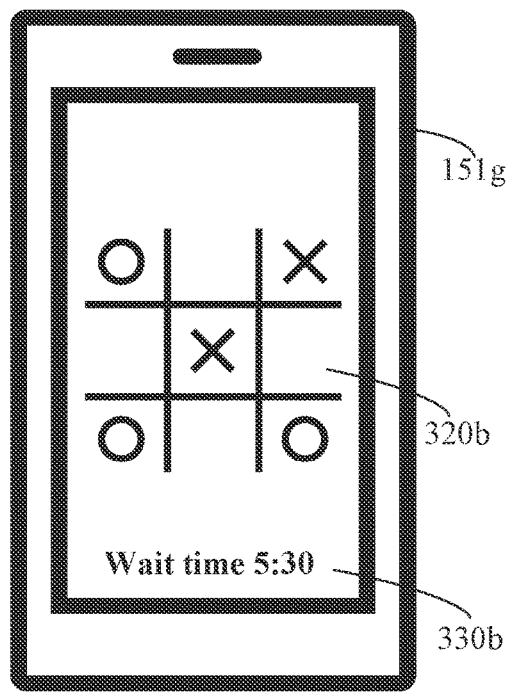
FIG. 3A                     FIG. 3B

400

```
┌─────────────────────────────────────┐
│ PERFORMING ONE OR MORE POS TASKS IN A │
│      RETAIL ENVIRONMENT             │
│              410                    │
└─────────────────────────────────────┘
                  │
                  ▼
┌─────────────────────────────────────┐
│ DETECTING THAT THE POS SYSTEM WILL BE│
│ OCCUPIED WITH PERFORMING THE ONE OR │
│  MORE POS TASKS FOR MORE THAN A     │
│      THRESHOLD AMOUNT OF TIME       │
│              420                    │
└─────────────────────────────────────┘
                  │
                  ▼
┌─────────────────────────────────────┐
│ RESPONSIVE TO THE DETECTING, INITIATING│
│  AN IN-STORE EVENT WITHIN THE RETAIL│
│   ENVIRONMENT AND TRANSMITTING THE  │
│ GRAPHICAL NOTIFICATION INTERFACE TO AT│
│  LEAST ONE WIRELESS DEVICE ASSOCIATED│
│      WITH A SHOPPER IN THE RETAIL   │
│  ENVIRONMENT, WHEREIN THE GRAPHICAL │
│   NOTIFICATION INTERFACE COMPRISES  │
│  GRAPHICAL ELEMENTS DEPICTING THE IN-│
│            STORE EVENT              │
│              430                    │
└─────────────────────────────────────┘
```

FIG. 4

TRANSACTION MANAGEMENT SYSTEM

BACKGROUND

In-store marketing is commonly used to optimize the sales, shopping, and checkout experience for the shopper and the retailer. Marketing techniques, including strategic product and signage placement along transaction lines for Point of Sale (PoS) terminals (such as self-service kiosks and attendant-assisted kiosks), are often used to drive sales and enhance the shopper transaction waiting experience. These techniques influence shoppers to purchase more products and bear with arbitrary transaction line wait times.

Unless explicitly identified as such, no statement herein is admitted as prior art merely by its inclusion in the Background section.

BRIEF DESCRIPTION OF THE DRAWINGS

Aspects of the present disclosure are illustrated by way of example and are not limited by the accompanying Figures with like references indicating like elements.

FIG. 2 is a schematic of a transaction queue according to some aspects of the present disclosure.

FIG. 3A-B show schematics of a mobile device display, including targeted marketing, according to some aspects of the present disclosure.

FIG. 4 is a flow chart of a method performed according to some aspects of the present disclosure.

DETAILED DESCRIPTION

Figure 1:
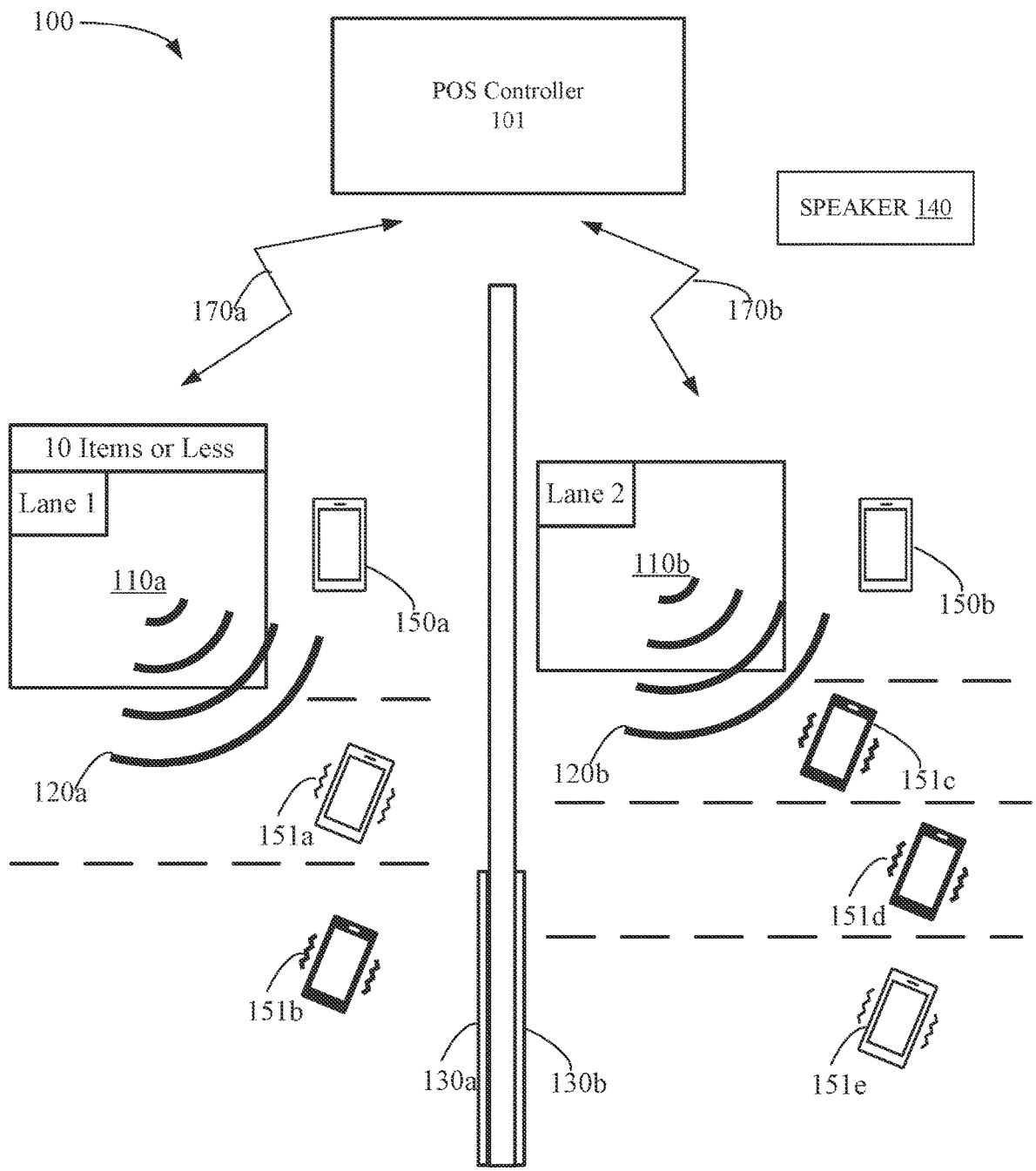
FIG. 1 is a schematic of a transaction management system according to some aspects of the present disclosure.

Embodiments of the present disclosure generally relate to a computing system that calculates a shopper's transaction service time at a PoS terminal and automates electronic in-store events to accommodate a waiting shopper during the wait time.

The current methods for estimating PoS wait times and PoS terminal use management require human estimations by shoppers and employees that are often incorrect or hard to manage.

Shoppers traditionally disfavor waiting in line, particularly because it can be difficult to determine whether to expect a 5-minute or a 25-minute wait. Stores that tend to encourage shoppers to sign-up for store programs, warranties, and the like during transactions can balloon the time it takes for a preceding shopper to complete the transaction, even with a small purchase. Performing a refund or a price check may also cause unexpected delays. Not knowing how long the wait times are may result in a shopper impatiently standing in line or avoiding checking out completely.

Further, estimating wait times can be just as difficult for a retail manager as it is for shoppers. A retail manager may monitor transaction lines at PoS terminals to determine whether to open or close a PoS terminal based on the length of store lines. In certain situations, a retail employee may not be able to keep track of wait line conditions to determine when to open or close a PoS terminal. Poor management of PoS terminals may cause misuse of employee assignment and in-store resources in multi-level (floors) department stores and multi-lane superstores.

Aspects of the present disclosure relate to a computer-based system for monitoring and calculating an estimated transaction service time. The transaction service time is calculated based on PoS terminal computing activities (e.g., PoS tasks) detected by the transaction management system. The indication of the PoS tasks is wirelessly communicated to a PoS controller. The PoS controller may calculate and transmit a wait time to a shopper. The system controller may additionally or alternatively initiate an in-store event to distract the customer additionally or alternately, the PoS controller may inform the shopper or store personal of the wait time. This computer-based system for informing shoppers or keeping them occupied may drive increased sales and improve shopper satisfaction.

A PoS controller recognizes one or more PoS tasks based on information wirelessly communicated from the PoS terminals to the PoS controller and estimates the transaction service time calculated based on certain factors. The transaction management system may recognize when the PoS terminal is transitioning to a new PoS task like creating a new store membership account, adding a warranty to a product, processing a return, or searching the store's online catalog for another size.

In another aspect, the transaction management system may wirelessly communicate with PoS terminals and monitor PoS tasks at each PoS terminal to determine whether to close or open PoS terminals. In-store personnel may also be notified of the need to adjust PoS terminal usage. Terminal use management may save power and PoS terminal resources and may improve employee management and shopper satisfaction.

FIG. 1 is a schematic of a transaction management system 100 in a retail environment according to some aspects of the present disclosure. The transaction management system 100 includes a PoS controller 101, PoS terminals 110a-b and wireless devices 150a-b and 151a-e associated with a shopper in the retail environment.

The wireless devices 150a-b are associated with a shopper who is currently checking out at a PoS terminal 110a-b. The wireless devices 151a-e are associated with shopper who is currently waiting for checkout at a PoS terminal 110a-b.

The retail environment may be, for example, a small or midsized store, a superstore, a multi-level store, or a department store. The PoS controller 101 may be within or outside the retail environment. One or more PoS terminals 110a-b may be located within the retail environment.

The PoS controller 101 may be a centralized computing resource that performs transaction management for a network of PoS terminals 110a-b located within the retail environment. In this example, the controller 101 and PoS terminals 110a-b wirelessly communicate through signals 170a-b with the PoS terminals 110a-b. In other examples, the PoS controller 101 may be hardwired (for example, by either ethernet or token ring) to the PoS terminals 110a-b or programmed within PoS terminals 110a-b. Although the figure shows two PoS terminals 110a-b connected to the PoS controller 101, this illustration should not limit the number of terminals that may be connected to the PoS controller 101. For example, a collection of two or more terminals may be connected to the PoS controller 101. It should be appreciated that the PoS terminals 110a-b may be placed in no particular order throughout a retail environment.

The PoS terminals 110a-b may be self-service kiosks, employee-assisted transaction kiosks, or a mobile device having PoS software configured to perform sales transactions. Each of the PoS terminals 110a-b may include at least one audio 120a-b and one or more displays 130a-b and other conventional input-output devices for PoS terminals.

A transaction procedure may be initiated at a PoS terminal 110a-b. During the transaction procedure, PoS terminals 110a-b may be configured to transmit a current PoS task to the PoS controller 101. PoS terminals 110a-b may also recognize that the transaction is transitioning to a new PoS task.

In some aspects, a software background monitoring system may be installed at each PoS terminal 110a-b to monitor PoS tasks. In some aspects, a new PoS task may be recognized according to the use of the PoS software and/or PoS input and output devices coupled to the PoS terminal 110a-b. For example, once all items are scanned with a scanner, the PoS terminal may be operated to start a new PoS task of electronically signing up for a new store membership account, adding a warranty to a product, processing a return, or searching the store's online catalog for another size. If a new PoS task is recognized from a PoS terminal 110a-b, the PoS terminal 110a-b alerts the PoS controller 101 of the new PoS task. PoS tasks or activities may be triggered by the use of the terminal by an employee, or shopper, or by the completion of a previous task.

The PoS controller 101 receives updated PoS tasks from each of the PoS terminals 110a-b. The PoS controller 101 calculates an estimated transaction service time for a transaction at each of the PoS terminals 110a-b. The transaction service time 230a-i is an estimated amount of time indicating when the current transaction or PoS task will be complete. The PoS controller 101 includes a queue for storing transaction service time in memory for each PoS terminal 110a-b.

FIG. 2 provides examples of transaction queues 210a-b stored at a PoS controller 101 in a transaction management system 100. The queues 210a-b are configured to store information associated with one or more PoS terminals 211a-i within the transaction management system 100. The stored information may include a status type 240a-i and a transaction service time 230a-i.

The PoS controller 101 may establish and assign a status type 240a-i to each of the PoS terminals 211a-i. The status type 240a-i is determined according to an estimated task time 211a-i calculated by the PoS controller 101.

A status may include any one of an in-use status (IU), a non-use status (NU), or an in-use non-occupied (IUNO) status. The non-usage of any PoS terminal may be represented as a null value. An in-use non-occupied PoS terminal may be indicated by a zero transaction time (e.g., 230f-g) value. In some examples, controller 101 may control the PoS terminals 211a-i to move from a non-use status to an in-use status based on a transaction service time 230a-i associated with each PoS terminal 211a-i. Transaction queue 210a includes a PoS terminal 211a that is not in use. Queues 211f and 211g include PoS terminals that are in-use but not occupied by a shopper.

Identifying the status type 240a-i may be very advantageous, especially at self-service kiosks that are not employee-assisted or at superstores with many terminal lanes. For example, a superstore operating on a 24-hour business hour schedule may have slow hours where there are or is expected to have very few shoppers (e.g., 2 a.m.). In this case, the retail environment may only need to have one PoS terminal in operation.

In some aspects of the present disclosure, as the hours change, more PoS terminals 211a-i may be programmed by the PoS controller 101 to open or close automatically.

In some aspects, the PoS controller 101 may open or close PoS terminals 211a-i depending on the estimated transaction times. When a fluctuation in PoS terminal 211a-i usage occurs, the PoS controller 101 may alert retail personnel.

Aspects of the present disclosure may be implemented in, for example, multi-level department stores, including PoS terminals 110a-b placed in different locations throughout the store. Situations may arise where terminals in more secluded areas go unnoticed and unused while other PoS terminals in more popular areas are overused. In other examples, superstores sometimes have closed PoS terminals 110a-b while shoppers wait at a few open PoS terminals 110a-b with long waiting lines. The opposite is true when too many terminals are open while not enough shoppers are present. For example, the same superstore at 3 a.m. may not have many shoppers, and therefore, only one or two self-service PoS terminals 211a-i should be operational.

In some aspects of the present disclosure, the PoS controller 101 may transmit instructions to cause the display 130a-b or audio device 120a-b to direct shoppers to the location of unoccupied PoS terminals 211a-i.

An estimated task time may be assigned for each transaction task, for example, one minute for signing up for a rewards program or three minutes for returning an item. The PoS controller 101 may include a table stored in a memory for storing tasks and the associated estimated transaction service time 230a-i. When the PoS controller 101 receives an updated task from any of the PoS terminals 211a-i, a transaction service time 230a-i associated with the PoS terminals 211a-i is recalculated and updated to include the new task.

The controller may set a local threshold wait time for each PoS terminal 211a-i or a global threshold wait time for an entire queue 210a-b.

In some aspects, if the transaction service time 230a-i for any one of the PoS terminals 211a-i is over a local threshold, the controller may transmit a signal to the PoS terminal 211a-i. The signal may include control instructions for the PoS terminal 211a-i to perform a local in-store event. For example, PoS terminal 211i has an estimated wait time 230i of 6:20. The threshold wait time for that terminal may be three minutes. In this case, the PoS controller 101 may signal the PoS terminal 211i to direct shoppers to an in-store event that will last for the estimated wait time 211i (6:20) to redirect shoppers away from the line. The in-store event may be local to the PoS terminal 211i. The in-store event may include generating a video on display 130a-b that advertises a sale of a product located somewhere else in the retail environment. A song or audio advertisement may be played using an audio device 120a-b at the PoS terminal 211i. Shoppers who are lured away from the line by the in-store event avoid being dissatisfied with wait times.

In other aspects, if a transaction service time 230a-i indicated by a combined transaction service time 230a-i for each PoS terminal 211a-d or 211e-i is over a global threshold wait time, a global in-store event may be triggered. The PoS controller 101 may transmit instructions to one or multiple devices within the store to perform one or more marketing activities for a predetermined amount of time. One or multiple devices may include a store speaker 140 in the retail environment. The speaker 140 may be instructed to play an advertisement.

FIGS. 3A and 3B are schematics of different wireless device displays 130a-b, each including targeted marketing, according to some aspects of the present disclosure. The in-store event may be transmitting transaction service time media 320a, 320b to a wireless device 151a-g, located within the retail environment. The transaction service time media 320*a-b* may include, for example, an advertisement for an in-store product or a coupon for the product, as shown in the example of FIG. 3A. During an excessive wait time, the transaction management system 101 may trigger a game to be sent to the wireless device 151*g*, as shown in the example of FIG. 3B.

In the event that a PoS controller 101 detects that the transaction management system 100 will be occupied with performing one or more PoS tasks for more than a threshold amount of time, the PoS management system 100 may initiate an in-store event within the retail environment. The PoS management system may generate a graphical notification interface and transmit the graphical notification interface to at least one wireless device 151*a-g* associated with a shopper in the retail environment. The graphical notification interface includes graphical elements depicting the in-store event.

FIG. 4 is a flow chart of a method 400 implemented by the transaction management system 100, according to some aspects of the present disclosure. The method includes performing one or more PoS tasks in a retail environment (410).

According to some aspects, a PoS task is a computing task performed by a PoS terminal 110*a*-110*b* in the transaction management system 100.

According to some aspects of the present disclosure, one or more PoS tasks are performed at a PoS terminal 110*a-b* in the transaction management system 100.

The method further includes detecting that the transaction management system 100 will be occupied with performing one or more PoS tasks for more than a threshold amount of time (420).

According to some aspects, the threshold amount time may be a local threshold wait time or a global threshold wait time.

According to some aspects of the present disclosure, detecting that the transaction management system 100 will be occupied includes determining that the PoS terminal 110*a-b* has a transaction service time 230*a-i* that is more than the threshold amount of time.

According to another aspect of the present disclosure, detecting that the transaction management system 100 will be occupied includes determining that all of one or more PoS terminals 110*a-b* included in the transaction management system 100 have a transaction service time 230*a-i* that is more than the threshold amount of time.

According to another aspect of the present disclosure, the transaction management system 101 may detect that there is a line of shoppers located at a PoS terminal 110*a-b* of the transaction management system 101. The transaction management system may include a device sensor for detecting wireless devices associated with a shopper. The device sensor may be located throughout the store. Additionally, or alternatively, the device sensor may be located at a PoS terminal.

After detecting that the transaction management system 100 will be occupied with performing one or more PoS tasks for more than a threshold amount of time.

According to some aspects, an in-store even is initiated within the retail environment and generating a graphical notification interface and transmitting the graphical notification interface to at least one wireless device associated with a shopper in the retail environment. The graphical notification interface includes graphical elements depicting the in-store event. (430).

According to another aspect of the present disclosure, the initiating an in-store event includes sending a transaction service time to a wireless device 151*a-g* associated with a shopper.

According to another aspect of the present disclosure, the initiating an in-store event comprises sending the graphical notification interface, including a transaction service time, to a wireless device associated with the shopper.

According to another aspect of the present disclosure, the initiating an in-store event includes sending an alert to store personnel.

According to another aspect of the present disclosure, the initiating an in-store event includes triggering a speaker 140 located in the retail environment to play an advertisement.

According to another aspect of the present disclosure, the initiating an in-store event includes activating a digital sign.

Figure 5:
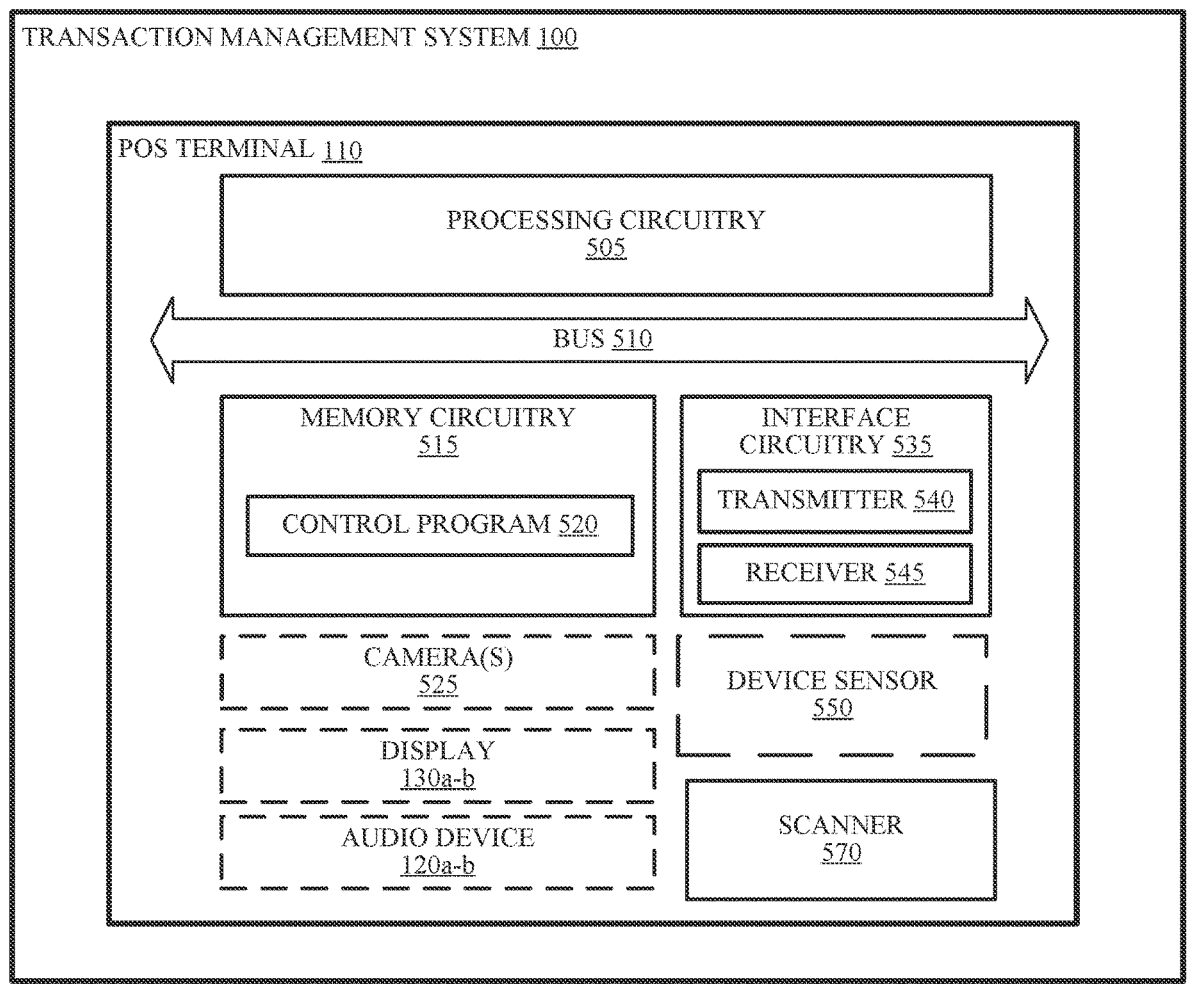
FIG. 5 is a schematic block diagram illustrating an exemplary transaction management system, according to one or more embodiments of the present disclosure.

FIG. 5 is a schematic block diagram illustrating an exemplary transaction management system 100. The transaction management system 100 includes a PoS terminal 110 according to one or more embodiments of the present disclosure. The example PoS terminal 110 includes processing circuitry 505, memory circuitry 515, and interface circuitry 535. The processing circuitry 505 is communicatively coupled to the memory circuitry 515 and the interface circuitry 535, e.g., via one or more buses 510. The processing circuitry 505 may include one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, processing circuitry 505 may be programmable hardware capable of executing a control program 520 stored, e.g., as a machine-readable computer program 520 in the memory circuitry 515. The memory circuitry 515 of the various embodiments may include any non-transitory machine-readable media known in the art, or that may be developed, whether volatile or non-volatile, including but not limited to solid state media (e.g., SRAM, DRAM, DDRAM, ROM, PROM, EPROM, flash memory, solid-state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 535 may be a controller hub configured to control the input and output (I/O) data paths of the PoS terminal 110. Such I/O data paths may include data paths for exchanging signals over a communications network and data paths for exchanging signals with an electronic device or a user. For example, interface circuitry 535 may include a transceiver configured to send and receive communication signals over one or more of a cellular network, Ethernet network, or optical network. The interface circuitry 535 may also include (or be communicatively connected to) one or more a graphics adapters, display port, video bus, touchscreen, graphical processing unit (GPU), display port, Liquid Crystal Display 130*a-b* (LCD), and Light Emitting Diode (LED) display 130*a-b*, for presenting visual information to a user. The interface circuitry 535 may also include one or more of a pointing device (e.g., a mouse, stylus, touchpad, trackball, pointing stick, joystick), touchscreen, microphone for speech input, optical sensor for optical recognition of gestures, and keyboard for text entry. In some aspects of the current disclosure, the PoS terminal 110 may additionally or alternatively include a combination of 1 sensors, including one or more cameras 525, device sensors 550, scanners 570, and one or more displays 130*a-b*, audio devices 120*a-b* (i.e., speakers), I/O devices, scanners 570, device sensors 550, illumination sources, and/or near-field receivers, either as part of the interface circuitry 535 or communicatively connected to it.

The interface circuitry 535 may be implemented as a unitary physical component or as a plurality of physical components that are contiguously or separately arranged, any of which may be communicatively coupled to any other or may communicate with any other via the processing circuitry 505. For example, the interface circuitry 535 may include output circuitry (e.g., transmitter circuitry 540 configured to send communication signals over the communications network) and input circuitry (e.g., receiver circuitry 545 configured to receive communication signals over the communications network and or a device sensor network). Similarly, the output circuitry may include a display 130*a-b*, whereas the input circuitry may include a keyboard, touch screen, or card reader. Other examples, permutations, and arrangements of the above and their equivalents will be readily apparent to those of ordinary skill.

Other embodiments include a non-transitory computer-readable medium (e.g., the memory circuitry 515) storing a computer program (e.g., control program 520) that includes software instructions that, when run on processing circuitry 505 of the PoS terminal 110, cause the PoS terminal 110 to perform any of the methods disclosed herein.

One or more device sensors 550 may be part of a network or system of sensors. The one or more device sensors 550 determine a presence of a wireless device 151*a-g* located in a predetermined geolocation. In some examples, the geolocation is within a retail environment. Device sensor 550 includes a circuit, a plurality of radio frequency receivers and a memory and processor, configured to determine the location of a wireless device 151*a-g*. A device sensor may be located within the PoS terminal 110*a*, 110*b* or it may be communicatively coupled to the PoS terminal 110 or a central computing system such that control and/or command signals can be exchanged between the device sensors 550 and PoS terminal 110*a*, 101*b* or a central computing system. The PoS terminal 110 or central computing system may receive a communication signal from one or more device sensors 550 that provide information regarding the location and time of reception of an RF signal at each of a plurality of device sensors 550. The device sensor 550 may detect all wireless devices including but not limited to wireless devices operating in 2G, 3G, 4G, 5G, CDMA, GSM, PCS, UMTS.

The present disclosure may, of course, be carried out in other ways than those set forth herein without departing from essential characteristics of the present disclosure. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various sequences and orders while still falling within the scope of the present disclosure.

While the concepts of the present disclosure are susceptible to various modifications and alternative forms, specific exemplary aspects of the disclosure have been shown by way of example in the drawings and are described in detail herein. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A method implemented by a transaction management system comprising a Point of Sale (PoS) controller and two or more PoS terminals, the method comprising:
   performing, by each of the PoS terminals, one or more PoS tasks in a retail environment;
   execute, by each of the PoS terminals, background monitoring software to monitor for an item scanned by a scanner of the PoS terminal; and
   transmit, from each of the PoS terminals and to the PoS controller, information regarding the item scanned by the scanner of the PoS terminal;
   receiving, by the PoS controller and from each of the PoS terminals, the information regarding the items scanned;
   calculating, by the PoS controller and based on the information regarding the scanned items scanned, a combined transaction service time indicating that the transaction management system is occupied performing the PoS tasks for more than a threshold amount of time;
   responsive to detecting that the combined transaction time is over a threshold amount of time, initiating, by the PoS controller, an in-store event within the retail environment;
   generating, by the PoS controller, a graphical notification interface comprising graphical elements depicting the in-store event; and
   transmitting, by the PoS controller, the graphical notification interface to at least one wireless device associated with a shopper in the retail environment.

2. The method of claim 1, further comprises detecting that there is a line of shoppers located at a PoS terminal of the transaction management system.

3. The method of claim 1, further comprises selecting the in-store event based on the PoS tasks occupying the transaction management system.

4. The method of claim 3, further comprising estimating an amount of time that the transaction management system will be occupied by the PoS tasks, wherein selecting the in-store event based on the PoS tasks comprises selecting the in-store event based on an estimated amount of time.

5. The method of claim 1, wherein the initiating an in-store event comprises sending the graphical notification interface, including a transaction service time, to a wireless device associated with the shopper.

6. The method of claim 1, wherein the initiating an in-store event comprises sending an alert to store personnel.

7. The method of claim 1, wherein the initiating an in-store event comprises triggering a speaker located in the retail environment to play audio.

8. The method of claim 1, wherein the initiating an in-store event comprises activating a digital sign.

9. A transaction management system comprising:
   a Point of Sale (PoS) controller and two or more PoS terminals;
   wherein each of the PoS terminals comprises a scanner, processing circuitry and memory comprising instructions executable by the processing circuitry whereby the processing circuitry is configured to:
   perform one or more PoS tasks in a retail environment;
   execute background monitoring software to monitor for an item scanned by the scanner; and transmit information regarding the scanned item to the PoS controller;

wherein the PoS controller is configured to:
  receive the information regarding the scanned item from the PoS terminal;
  calculate, based on the information regarding the scanned items, and a combined transaction service time indicating that the transaction management system is occupied performing the PoS tasks for more than a threshold amount of time;
  responsive to detecting that the combined transaction time is over a threshold amount of time, initiate an in-store event within the retail environment;
  generate a graphical notification interface comprising graphical elements depicting the in-store event; and
  transmit the graphical notification interface to at least one wireless device associated with a shopper in the retail environment.

10. The transaction management system of claim 9, wherein the processing circuitry is further configured to detect that there is a line of shoppers located at a PoS terminal of the transaction management system.

11. The transaction management system of claim 9, wherein the processing circuitry is further configured to select the in-store event based on the PoS tasks occupying the transaction management system.

12. The transaction management system of claim 11, wherein the processing circuitry is further configured to estimate an amount of time that the transaction management system will be occupied by the PoS tasks, wherein to select the in-store event based on the PoS tasks the processing circuitry is configured to select the in-store event based on an estimated amount of time.

13. The transaction management system of claim 9, wherein to initiate an in-store event, the processing circuitry is configured to send the graphical notification interface, including a transaction service time, to a wireless device associated with the shopper.

14. A non-transitory computer-readable medium storing a computer program comprising software instructions that, when run on processing circuitry of a transaction management system that comprises a Point of Sale (PoS) controller and two or more PoS terminals, cause the transaction management system to:
  perform, by each of the PoS terminals, one or more PoS tasks in a retail environment;
  execute, by each of the PoS terminals, background monitoring software to monitor for an item scanned by a scanner of the PoS terminal; and
  transmit, from each of the PoS terminals and to the PoS controller, information regarding the item scanned;
  receive, by the PoS controller, the information regarding the items scanned;
  calculating, by the PoS controller and based on the information regarding the scanned items, a combined transaction service time indicating that the transaction management system is occupied performing the PoS tasks for more than a threshold amount of time;
  responsive to detecting that the combined transaction time is over a threshold amount of time, initiate, by the PoS controller, an in-store event within the retail environment;
  generate, by the PoS controller, a graphical notification interface comprising graphical elements depicting the in-store event; and
  transmit, by the PoS controller, the graphical notification interface to at least one wireless device associated with a shopper in the retail environment.

* * * * *